US012014200B2

(12) United States Patent
Rosenboom (10) Patent No.: US 12,014,200 B2
(45) Date of Patent: **\*Jun. 18, 2024**

(54) SERVER SUPPORT FOR MULTIPLE AUDIO/VIDEO OPERATING SYSTEMS

(71) Applicant: QSC, LLC, Costa Mesa, CA (US)

(72) Inventor: Gerrit Eimbertus Rosenboom, Boulder, CO (US)

(73) Assignee: QSC, LLC, Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,442

(22) Filed: Dec. 16, 2022

(65) Prior Publication Data

US 2023/0121304 A1 Apr. 20, 2023

Related U.S. Application Data

(63) Continuation of application No. 16/231,234, filed on Dec. 21, 2018, now Pat. No. 11,561,813.
(Continued)

(51) Int. Cl.
*G06F 9/455* (2018.01)
*G06F 9/4401* (2018.01)
(Continued)

(52) U.S. Cl.
CPC ........ *G06F 9/45558* (2013.01); *G06F 9/4406* (2013.01); *G06F 9/5077* (2013.01);
(Continued)

(58) Field of Classification Search
CPC .. G06F 9/45558; G06F 9/4406; G06F 9/5027; G06F 2009/45595; H04L 65/60
See application file for complete search history.

(56) References Cited

U.S. PATENT DOCUMENTS 5,490,247 A 2/1996 Tung et al.
5,913,062 A 6/1999 Vrvilo et al.
(Continued)

FOREIGN PATENT DOCUMENTS

CN 102291428 A 12/2011
CN 104956329 A 9/2015
(Continued)

OTHER PUBLICATIONS

Heo, Jin. "Voice over IP (VoIP) Performance Evaluation on VMware vSphere 5.0," Performance Study, Technical Whitepaper. Dec. 1, 2015, pp. 1-10. <www.vmware.com/content/dam/digitalmarketing/vmware/en/pdf/techpaper/voip-performance-vsphere5-whitepaper>.
(Continued)

*Primary Examiner* — Wei Y Zhen
*Assistant Examiner* — Brahim Bourzik
(74) *Attorney, Agent, or Firm* — Perkins Coie LLP (57) ABSTRACT

Technology is disclosed for establishing and administering multiple virtual machines, each with an audio, video and control (AVC) operating system (OS). The technology can also establish and administer cloud based AVC OSs. A server implementing this technology can perform real-time AVC processing, alongside soft and non-real-time processing and can host multiple, independent, virtual AVC OSs. Each AVC OS can perform the processing for an AVC setup. Each of the AVC OSs can be operated by a corresponding virtual machine controlled by a hypervisor running on the server. A cloud based AVC OS can perform processing for a corresponding remote AVC setup comprising multiple AVC devices. An AVC routing system can cause AVC signals from a particular AVC setup to reach a corresponding cloud AVC OS and conversely can cause signals from an AVC OS to reach the correct destination device.

19 Claims, 9 Drawing Sheets

Related U.S. Application Data (60) Provisional application No. 62/624,074, filed on Jan. 30, 2018, provisional application No. 62/617,795, filed on Jan. 16, 2018.

(51) Int. Cl.
*G06F 9/50* (2006.01)
*H04L 65/60* (2022.01)
*H04N 21/443* (2011.01)

(52) U.S. Cl.
CPC .......... *H04L 65/60* (2013.01); *H04N 21/443* (2013.01); *G06F 2009/45562* (2013.01); *G06F 2009/45591* (2013.01); *G06F 2009/45595* (2013.01)

(56) References Cited

U.S. PATENT DOCUMENTS

| | | | |
|---|---|---|---|
| 6,055,560 A | 4/2000 | Mills et al. | |
| 6,266,408 B1 | 7/2001 | Park | |
| 8,069,206 B2 | 11/2011 | McDonald | |
| 8,150,052 B2 | 4/2012 | Gygax et al. | |
| 8,365,168 B1 | 1/2013 | Kodorkin et al. | |
| 8,441,515 B2 | 5/2013 | Yam | |
| 8,558,618 B2 | 10/2013 | Nussbaum et al. | |
| 8,738,972 B1* | 5/2014 | Bakman | G06F 11/3442 714/47.1 |
| 8,774,399 B2 | 7/2014 | Khanduri et al. | |
| 8,873,741 B2 | 10/2014 | Ballagas et al. | |
| 9,008,302 B2 | 4/2015 | Thapa et al. | |
| 9,223,635 B2 | 12/2015 | Huang et al. | |
| 9,258,266 B2 | 2/2016 | Nataraja et al. | |
| 9,357,171 B2 | 5/2016 | Toren et al. | |
| 9,543,913 B2 | 1/2017 | Quilter et al. | |
| 9,628,206 B2 | 4/2017 | Perkins | |
| 9,641,559 B2 | 5/2017 | Maistri et al. | |
| 9,749,072 B2 | 8/2017 | Perkins | |
| 9,781,386 B2 | 10/2017 | Ben Natan et al. | |
| 9,935,915 B2 | 4/2018 | Manley et al. | |
| 10,901,809 B2 | 1/2021 | Rosenboom | |
| 11,063,565 B2 | 7/2021 | Lind et al. | |
| 11,194,607 B2 | 12/2021 | Rosenboom | |
| 11,276,417 B2 | 3/2022 | Moravy et al. | |
| 11,474,882 B2 | 10/2022 | Rosenboom | |
| 11,561,813 B2 | 1/2023 | Rosenboom | |
| 2002/0116234 A1 | 8/2002 | Nagasawa | |
| 2005/0091051 A1 | 4/2005 | Moriya et al. | |
| 2007/0165837 A1* | 7/2007 | Zhong | H04M 9/082 379/406.01 |
| 2008/0002663 A1 | 1/2008 | Tripathi et al. | |
| 2008/0019365 A1 | 1/2008 | Tripathi et al. | |
| 2010/0011200 A1 | 1/2010 | Rosenan | |
| 2010/0058335 A1 | 3/2010 | Weber | |
| 2010/0107162 A1* | 4/2010 | Edwards | H04L 45/58 718/1 |
| 2010/0146544 A1 | 6/2010 | Aoki et al. | |
| 2010/0272251 A1 | 10/2010 | Banba et al. | |
| 2011/0078681 A1 | 3/2011 | Li et al. | |
| 2011/0090915 A1* | 4/2011 | Droux | H04L 49/00 370/469 |
| 2011/0099485 A1 | 4/2011 | Alcorn et al. | |
| 2012/0184373 A1 | 7/2012 | Kim et al. | |
| 2012/0198444 A1 | 8/2012 | Tsai | |
| 2012/0230519 A1 | 9/2012 | Nussbaum et al. | |
| 2012/0296626 A1 | 11/2012 | Bond et al. | |
| 2013/0097244 A1 | 4/2013 | Manley et al. | |
| 2014/0064104 A1 | 3/2014 | Nataraja et al. | |
| 2014/0080428 A1 | 3/2014 | Rhoads et al. | |
| 2014/0082612 A1 | 3/2014 | Breitgand et al. | |
| 2014/0123135 A1 | 5/2014 | Huang et al. | |
| 2014/0139615 A1 | 5/2014 | Graham et al. | |
| 2014/0148934 A1 | 5/2014 | Manley et al. | |
| 2014/0192989 A1 | 7/2014 | Quilter et al. | |
| 2014/0282793 A1 | 9/2014 | Kasatani | |
| 2015/0127830 A1 | 5/2015 | Brown et al. | |
| 2015/0146715 A1 | 5/2015 | Olivier et al. | |
| 2015/0146716 A1 | 5/2015 | Olivier et al. | |
| 2015/0264035 A1 | 9/2015 | Waterhouse et al. | |
| 2015/0288735 A1 | 10/2015 | Krishnamoorthy et al. | |
| 2015/0304119 A1 | 10/2015 | Kim et al. | |
| 2015/0321097 A1 | 11/2015 | Wilkiewicz et al. | |
| 2016/0050079 A1* | 2/2016 | Martin De Nicolas | H04L 12/1827 455/416 |
| 2016/0241604 A1* | 8/2016 | Klein | H04L 65/1069 |
| 2016/0360317 A1 | 12/2016 | Lee et al. | |
| 2017/0055076 A1 | 2/2017 | Buono et al. | |
| 2019/0220299 A1 | 7/2019 | Rosenboom | |
| 2019/0220300 A1 | 7/2019 | Rosenboom | |
| 2019/0220328 A1 | 7/2019 | Rosenboom | |
| 2019/0267957 A1 | 8/2019 | Lind et al. | |
| 2021/0271528 A1 | 9/2021 | Rosenboom | |
| 2022/0164213 A1 | 5/2022 | Rosenboom | |

FOREIGN PATENT DOCUMENTS

| | | |
|---|---|---|
| CN | 105794169 A | 7/2016 |
| EP | 1853086 A1 | 11/2007 |
| EP | 3169040 A1 | 5/2017 |
| JP | 2009253524 A | 10/2009 |
| WO | 2011143434 A1 | 11/2011 |
| WO | 2014066820 A2 | 5/2014 |

OTHER PUBLICATIONS

International Searching Authority, International Search Report and Written Opinion, PCT Patent Application PCT/US2018/067358, mailed Mar. 27, 2019, 11 pages.

International Searching Authority, International Search Report and Written Opinion, PCT Patent Application PCT/US2018/067368, mailed May 14, 2019, 17 pages.

International Searching Authority, International Search Report and Written Opinion, PCT Patent Application PCT/US2018/067379, mailed May 20, 2019, 18 pages.

International Searching Authority, International Search Report and Written Opinion, PCT Patent Application PCT/US2019/019307, mailed Sep. 12, 2019, 20 pages.

International Searching Authority, Partial International Search Report, PCT Patent Application PCT/US2018/067368, mailed Mar. 19, 2019, 13 pages.

International Searching Authority, Partial International Search Report, PCT Patent Application PCT/US2018/067379, mailed Mar. 27, 2019, 13 pages.

Wikipedia. "Advanced Linux Sound Architecture", Dec. 11, 2017, 5 pages. <en.wikipedia.org/w/index.php? title=Advanced_Linux_Sound_Architecture&oldid=814921790> accessed on Feb. 11, 2022.

Xi, Sisu et al. "Rt-open stack: CPU resource management for real-time cloud computing." 2015 IEEE 8th International Conference on Cloud Computing, pp. 179-186.

* cited by examiner

SERVER SUPPORT FOR MULTIPLE AUDIO/VIDEO OPERATING SYSTEMS

CROSS REFERENCE TO RELATED APPLICATIONS

This application is a continuation of U.S. patent application Ser. No. 16/231,234, titled SERVER SUPPORT FOR MULTIPLE AUDIO/VIDEO OPERATING SYSTEMS, filed Dec. 21, 2018, which claims the benefit of and priority to U.S. Provisional Patent Application No. 62/617,795, titled SERVER SUPPORT FOR MULTIPLE AUDIO/VIDEO OPERATING SYSTEMS, filed Jan. 16, 2018, and U.S. Provisional Patent Application No. 62/624,074, titled CLOUD BASED AUDIO/VIDEO OPERATING SYSTEMS, filed Jan. 30, 2018, each of which is incorporated herein by reference thereto.

TECHNICAL FIELD

The present disclosure is directed to virtualization and cloud implementations of audio, video, and control systems.

BACKGROUND

Conventional computer hypervisor systems provide one or more software programs that manages multiple operating systems (or multiple instances of the same operating system) on a single computer system. The hypervisor manages the system's processor, memory, and other resources to allocate what each operating system requires. The conventional hypervisor systems run on a server or platform distinct from conventional audio, video and control (AVC) systems. In environments wherein audio, video and control hardware is provide in multiple locations, such as in conference rooms, meeting centers, convention centers, class rooms, entertainment centers, multi-room buildings, other structures, etc., separate AVC systems can be provided for each room or selection of rooms. Each AVC system runs on its own platform separate from the hypervisor system, such that providing separate AVC systems for each room or selected location can be expensive and integration of the multiple systems can be labor intensive and complex. Alternatively, one AVC system can be used for controlling the audio, video, and control hardware in multiple locations. When changes or adjustments are needed to the audio, video, or control hardware, however, all of the features associated with the AVC system are taken off line until completion of the adjustments. Such a situation can be very disruptive, distracting and expensive.

Conventional AVC systems manage various aspects of audio and video processing such as echo reduction and level controls. This processing is typically performed by on-premise equipment, whether locally connected to the AVC processing equipment or connected through a network operated by an organization. This on-premise equipment can be expensive to acquire and maintain, and can require highly-trained personnel to administer, e.g., by an AV or IT department. For example, an organization will often have an "AV Room" dedicated to the housing and management of the AVC processing equipment and AV technicians to operate the AVC equipment.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Some embodiments of the present technology provide a hypervisor operating system configured to establish and administer multiple virtual machines, each with a guest audio, video and control operating system. The ability to perform real-time audio, video, and control processing, alongside soft and non-real-time processing, in an AVC application running within a virtual machine (VM) can be configured to allow a single server to host multiple, independent, virtual AVC operating systems (OSs), and be managed by the IT department as a standard server. Each AVC OS can perform the processing for an AVC system, and can be started, stopped, and updated independently of the others. In addition to performing real-time audio and video signal processing, the AVC OSs are able to source and sync real-time audio and video streams across the server's hardware interfaces (e.g., network and USB) using the switching provided by the hypervisor running on the server. To ensure glitch-free real-time operation, each AVC OS on a virtual machine can be exclusively assigned to one or more CPU cores, with the core count determined by the processing requirements of the AVC system design assigned to that virtual machine.

Some embodiments of the present technology provide one or more cloud based AVC OSs, each configured to perform processing for a corresponding AVC setup. An AVC setup can include a set of one or more AVC devices, where each setup can be administered separately from other AVC setups. For example, an AVC setup can include all the AVC equipment on a floor, in a region of a building, for a set of conference rooms, for one or more event spaces, etc.

An AVC routing system can cause AVC signals from a particular AVC setup to reach a corresponding cloud AVC OS and conversely can cause signals from a cloud AVC OS to reach the correct destination device. In some implementations, the AVC routing system can comprise network devices that perform routing of AVC signals based on network addresses associated with the AVC signals. In some implementations, the AVC routing system can use a mapping, of AVC devices or setups to cloud AVC OSs, to determine where to route the AVC signals.

An AVC system, whether operated under a virtual machine or as the primary operating system of a computing device, can be configured to manage and control functionality of audio features, video features, and control features. For example, an AVC system can be configured for use with networked microphones, cameras, amplifiers, and/or controllers. The AVC system can also include a plurality of related features, such as acoustic echo cancellation, audio tone control and filtering, audio dynamic range control, audio/video mixing and routing, audio/video delay synchronization, Public Address paging, video object detection, verification and recognition, multi-media player and a streamer functionality, user control interfaces, scheduling, third-party control, voice-over-IP (VoIP) and Session Initiated Protocol (SIP) functionality, scripting platform functionality, audio and video bridging, public address functionality, other audio and/or video output functionality, etc. One example of an AVC system is included in the Q-Sys technology from QSC, LLC.

In the present disclosure, an operating system (OS) can be system software that manages computer hardware and software resources and provides common services for computer programs. The operating system can be configured to schedule tasks for efficient use of the system and may also include accounting software for cost allocation of processor time, mass storage, printing, and other resources. The operating system can also act as an intermediary between programs and the computer hardware for controlling hardware functions such as input and output and memory allocation.

Figure 1:
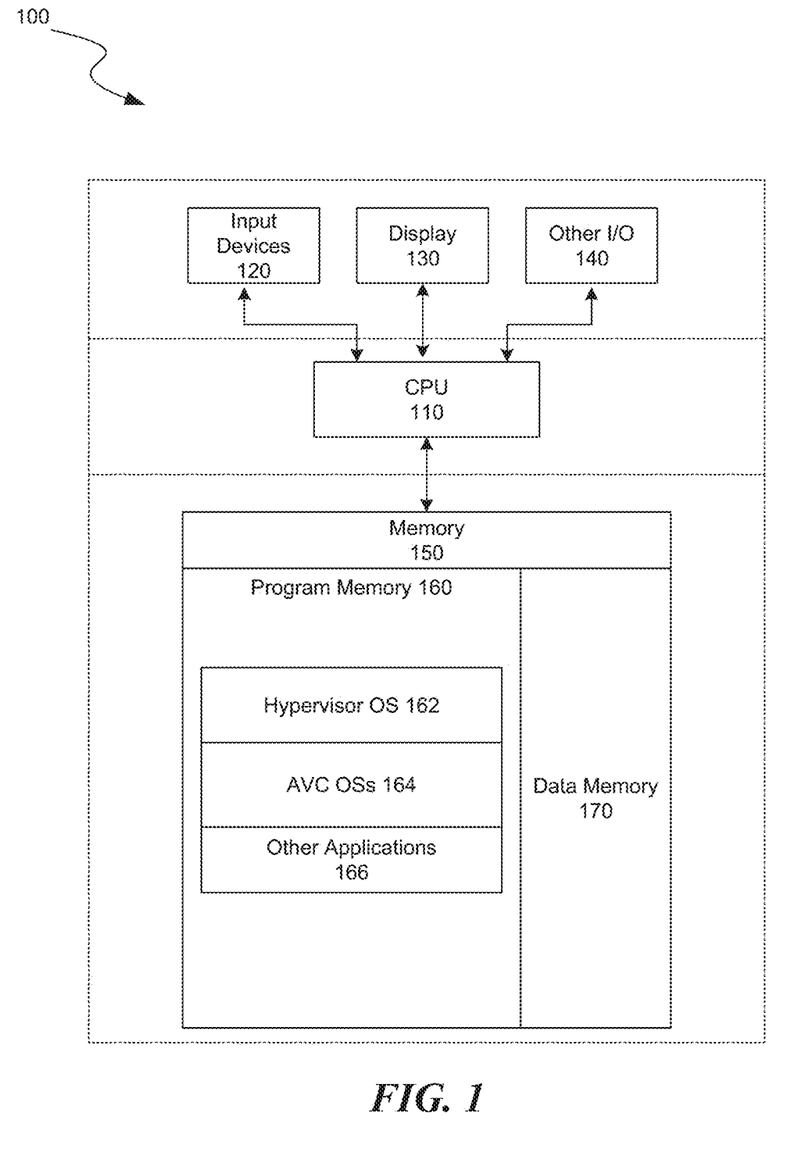
FIG. 1 is a block diagram illustrating an overview of devices on which some implementations can operate.

Several implementations are discussed below in more detail in reference to the figures. FIG. 1 is a block diagram illustrating an overview of devices on which some implementations of the disclosed technology can operate. The devices can comprise hardware components of a device 100 with a hypervisor OS 162 that administers multiple virtual machines, each with a guest OS 164. A virtual machine can be one or more computer applications used to create a virtual environment that allows a user run multiple operating systems on one computer at the same time. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols, a Q-LAN protocol, or others. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an Hypervisor OS 162, AVC OSs 164, and other application programs 166. Memory 150 can also include data memory 170 that can include data to be operated on by applications, configuration data, settings, options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, AVC I/O systems, networked AVC peripherals, video conference consoles, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
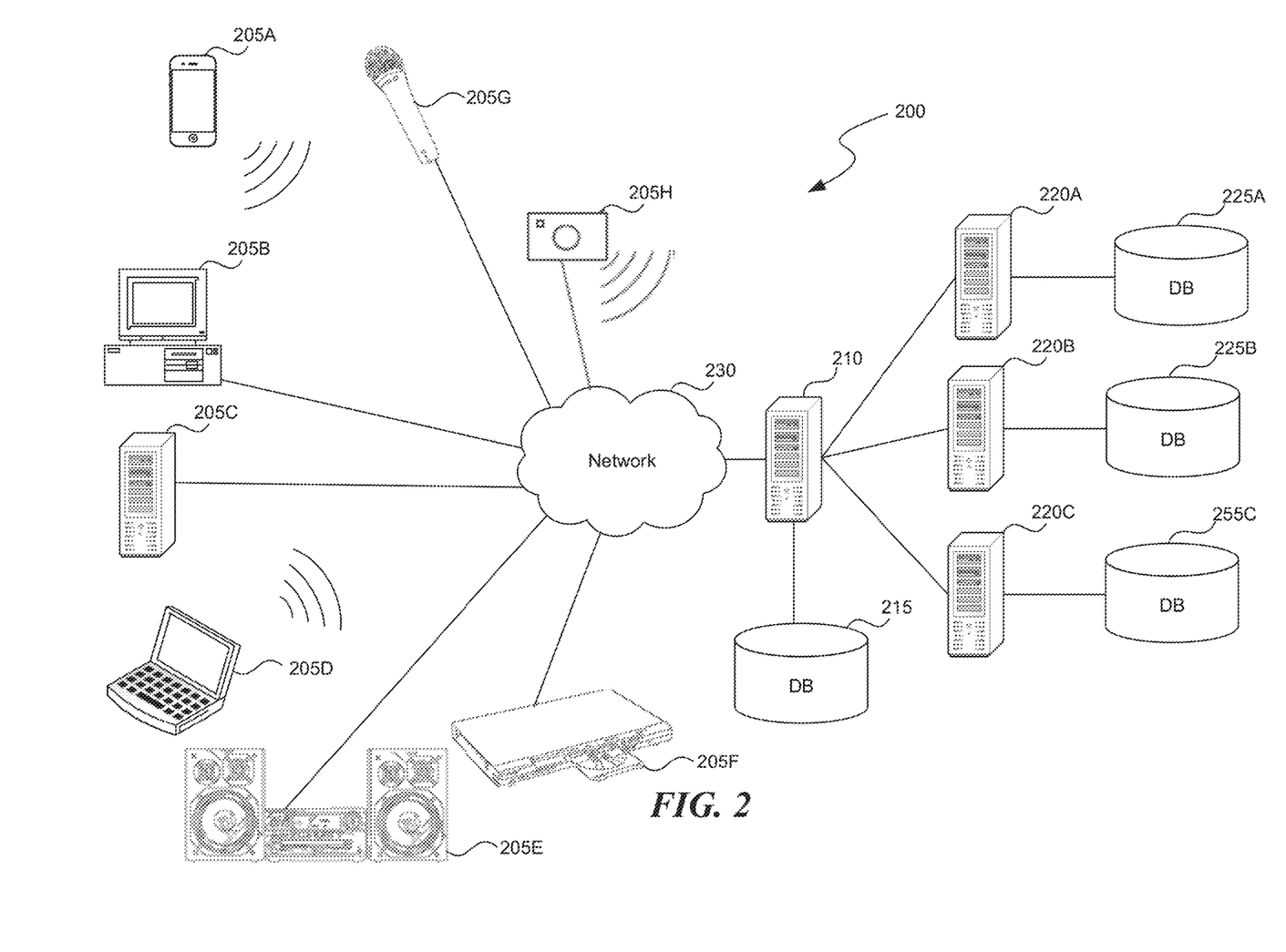
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-H, examples of which can include device 100. In the illustrated embodiment, device 205A is a wireless smart phone or tablet, device 205B is a desk-top computer, device 205C is a computer system, device 205D is a wireless laptop, device 205E is an audio system, device 205F is a video system, device 205G is a microphone system, and device 205H is a networked camera system. These are only examples of some of the devices, and other embodiments can include other computing devices. For example, device 205C can be a server with an OS implementing a hypervisor that can create and administer multiple AVC real-time operating systems (RTOS). The AVC OSs can provide various audio and video processing and connectivity for and between peripheral devices (whether local or networked). These processing and connectivity features can be provided by the host AVC OS of device 205C while concurrently supporting one or more virtual machines. Audio and video processing can include gain and level adjustments, echo reduction or cancellation, audio tone control and filtering, audio dynamic range control, audio/video mixing and routing, audio/video delay synchronization, Public Address paging, video object detection, verification and recognition, mixing, encoding/decoding, resolution adjustments, cropping, delay control, VoIP/SIP interface control, input control, etc. Client computing devices 205 can operate in a networked environment using logical connections 210 through network 230 to one or more remote computers, such as a server computing device. In some implementations, additional un-shown audio and video processing and routing components can be included in environment 200, such as: AVC equipment locally connected to devices 205 or I/O cards that provide networked points of connection for AVC equipment, switches operating on a Q-LAN protocol, etc.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. In some implementations, portions of network 230 can be a LAN or WAN implementing a Q-LAN protocol—an audio over IP networking technology of the Q-Sys audio signal processing platform from QSC Audio Products. Portions of network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
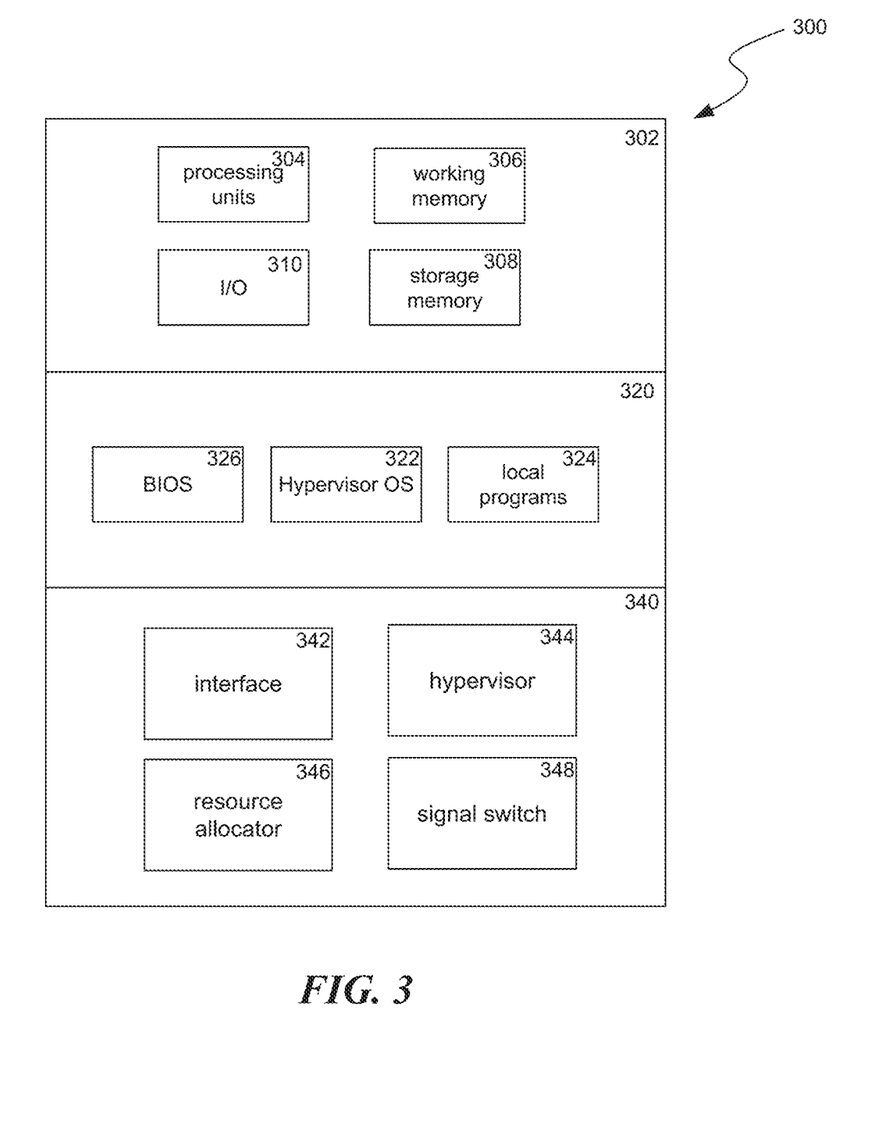
FIG. 3 is a block diagram illustrating components which, in some implementations, can be used in an AVC system, employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including a Hypervisor operating system 322, local programs 324, and a basic input output system (BIOS) 326. In some implementations, specialized components 340 can be subcomponents of one or more of the general software applications 320, such as Hypervisor OS 322. Specialized components 340 can include hypervisor 344, resource allocator 346, signal switch 348, and components which can be used for providing user interfaces, transferring data, and controlling the specialized components, such as interface 342. In some implementations, components 300 can be in a computing system that is distributed across multiple computing devices or can be an interface to a server-based application executing one or more of specialized components 340.

Hypervisor 344 can instantiate multiple virtual machines, each with a corresponding AVC OS. The hypervisor 344 can also allocate resources to each virtual machine with resource allocator 346 and can include a virtual switch 348 that can route AVC signals between virtual machines and AVC devices in corresponding AVC setups.

Resource allocator 346 can take an AVC setup description and determine an appropriate resource allocation, for a virtual machine executing an AVC OS, to administer that AVC setup. Resource allocator 346 can accomplish this for a particular AVC setup by: setting and initial resource allocation for the AVC setup; running the AVC setup description and the resource allocation for the AVC setup through an AVC compiler; and determining, based on results from the AVC compiler, if the resource allocation is sufficient for the AVC setup. If the resource allocation is insufficient, the resource allocation can be incremented and the compilation process can be performed again until the results indicate the resource allocation is sufficient.

Signal switch 348 can receive AVC signals from the AVC devices of the various AVC setups and route them to the corresponding virtual machine. Signal switch 348 can determine the correct virtual machine to route an AVC signal to based on a mapping between the devices in an AVC setup and a corresponding virtual machine. In some implementations, this mapping can be established when the virtual machine is created for the AVC setup, and can include a mapping of device identifiers in the AVC setup to the identifier of the virtual machine. If the AVC setup is modified, a corresponding modification can be made to the mapping. In various implementations, the identifiers can be IP addresses, MAC addresses, host names, port identifiers, or other identifiers that uniquely specify a device within the AVC system. Signal switch 348 can also receive AVC signals from a virtual machine and route the AVC signal to an AVC setup or to a particular device within an AVC setup.

In some implementations, instead of having signal switch 348, system 300 can use virtual network interface cards (NICs) assigned to each of the virtual machines that were initiated by hypervisor 344. Each virtual NIC can have an assigned addresses or addresses (e.g. an IP address, MAC address, etc.). When an signal arrives at system 300 addressed to one of the addresses assigned to one of the virtual NICs, that virtual NIC can be configured to control the network hardware in I/O 310 to receive the signal for the its assigned virtual machine. Also, when one of the virtual machines needs to transmit a signal, the hypervisor 344 can indicate one of the network cards of I/O 310 to use and the virtual machine can use its virtual NIC corresponding to that network card to control the indicated network card to send the signal.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
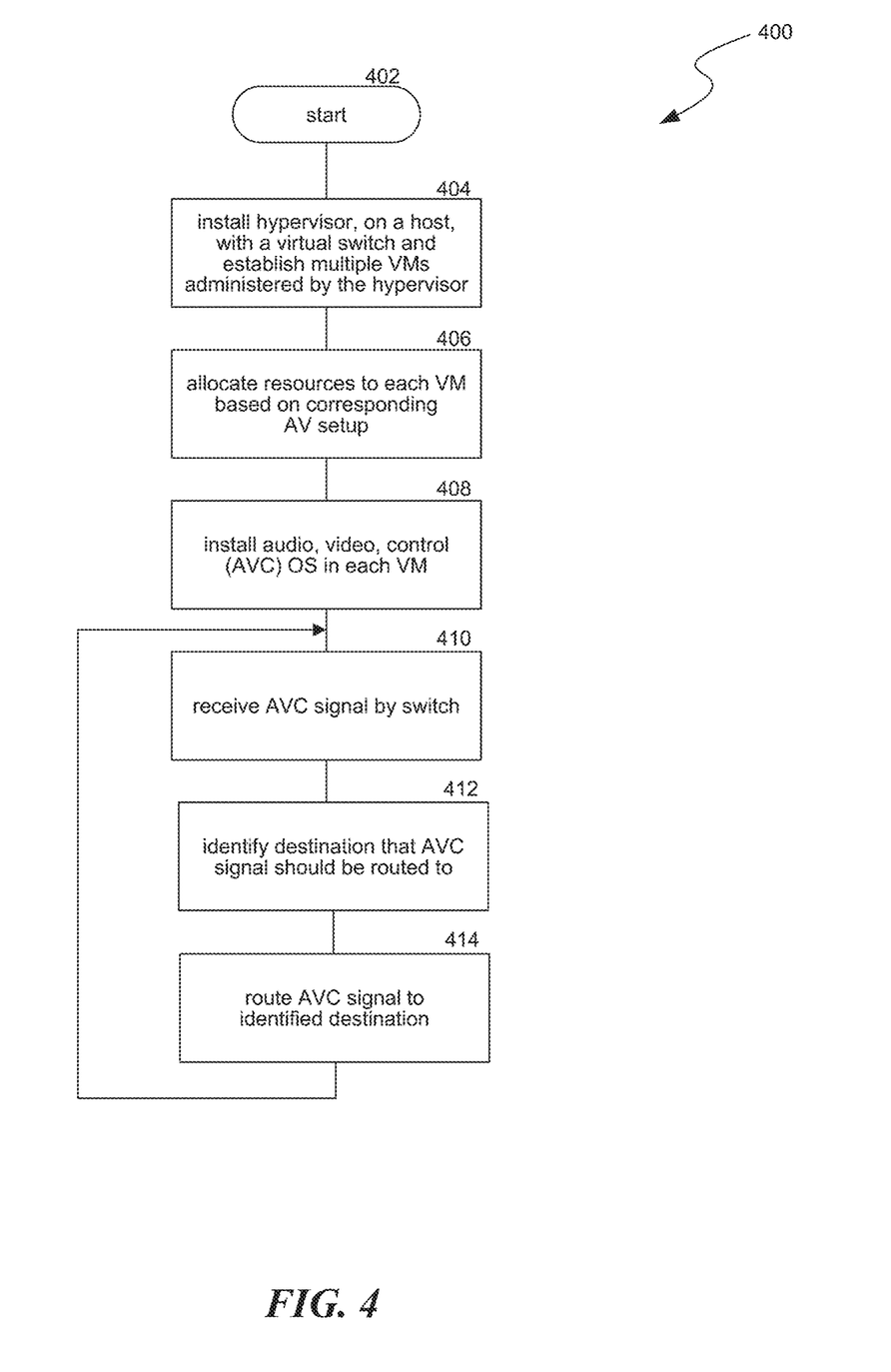
FIG. 4 is a flow diagram illustrating a process used in some implementations for establishing multiple AVC guest OSs in virtual machines and providing AVC signal routing to the virtual machines.

FIG. 4 is a flow diagram illustrating a process 400 used in some implementations for establishing multiple AVC guest OSs in corresponding virtual machines and providing AVC signal routing to the virtual machines. Process 400 begins at block 402 and continues to block 404. At block 404, process 400 can install a hypervisor in a host, with a virtual switch. A hypervisor is an application that can monitor and administer multiple virtual machines within a particular computing system. While various discussions herein refer to hypervisors as applications run by a host operating system of the host, in some of these cases the hypervisors can be run directly on the host hardware separate from the host operating system. A virtual switch can coordinate delivery of AVC signals from various AVC setups to a corresponding virtual machine executing on an AVC operating system. The hypervisor can then establish multiple virtual machines, operating under control of the hypervisor. An example environment using a hypervisor is discussed below with regard to FIG. 6A. In some implementations, instead of using a hypervisor, each virtual machine can one or more virtual network interface cards (NICs), which can each connect to and control a corresponding physical NIC. An example environment where virtual machines use virtual NICs is discussed below with regard to FIG. 6B.

At block 406, resources of the host computing system can be allocated to each virtual machine based on a corresponding AVC setup. Each AVC setup can include a set of multiple AVC devices, where the set can be administered separately from other AVC setups. For example, an AVC setup can include all the AVC equipment on a floor, in a region of a building, for a set of conference rooms, for one or more event spaces, etc. In some implementations, resources, such as CPU cores, can be allocated to a virtual machine for an AVC setup by allocating an initial amount of resources; evaluating the AVC setup with those resources to determine if the resources are sufficient to administer the AVC setup; and if not, adding additional resources and iterating until the allocated amount of resources are determined to be sufficient for the AVC setup. Additional details regarding allocating resources to a virtual machine for an AVC setup are provided below in relation to FIG. 5. In some implementations, as an AVC setup changes, or if an AVC setup is using more resources than expected, additional resources can be allocated to the virtual machine for that AVC setup.

At block 408, process 400 can install an audio, video, control (AVC) OS into each of the established virtual machines. In some implementations, the AVC OS can be a real-time operating system (RTOS). Each virtual machine executing an AVC OS can be mapped to device identifiers for the devices in the corresponding AVC setup. Device and virtual machine identifiers can include, for example, IP addresses, MAC addresses, host names, or other identifiers.

At block 410, the virtual switch, of the host AVC OS, can receive an AVC signal. The AVC signal can be from a network device that is included in one of the AVC setups or can be from one of the virtual machines. At block 412, the virtual switch can identify a destination to route the AVC signal to. When the AVC signal originates from a device in an AVC setup, the virtual switch can identify the destination as one of the virtual machines based on the mapping between the identifier of the source device to the virtual machine for the AVC setup that source device is a part of. In some implementations, this mapping can include a list of device identifiers to virtual machine identifiers. In some implementations, this mapping can include a mapping of device identifiers to AVC setup identifiers, which in turn are mapped to a particular virtual machine. When the AVC signal originates from one of the virtual machines, the AVC signal can be associated with a particular destination or device identifier for the virtual switch to route the AVC signal to. In some implementations, the virtual machines can send AVC signals directly to AVC setups or identified peripheral devices, without going through the virtual switch. At block 414, the AVC signal can be routed to the destination determined at block 412. Steps 410 through 414 of process 400 can be repeated as additional AVC signals are received from the peripheral devices or virtual machines.

Figure 5:
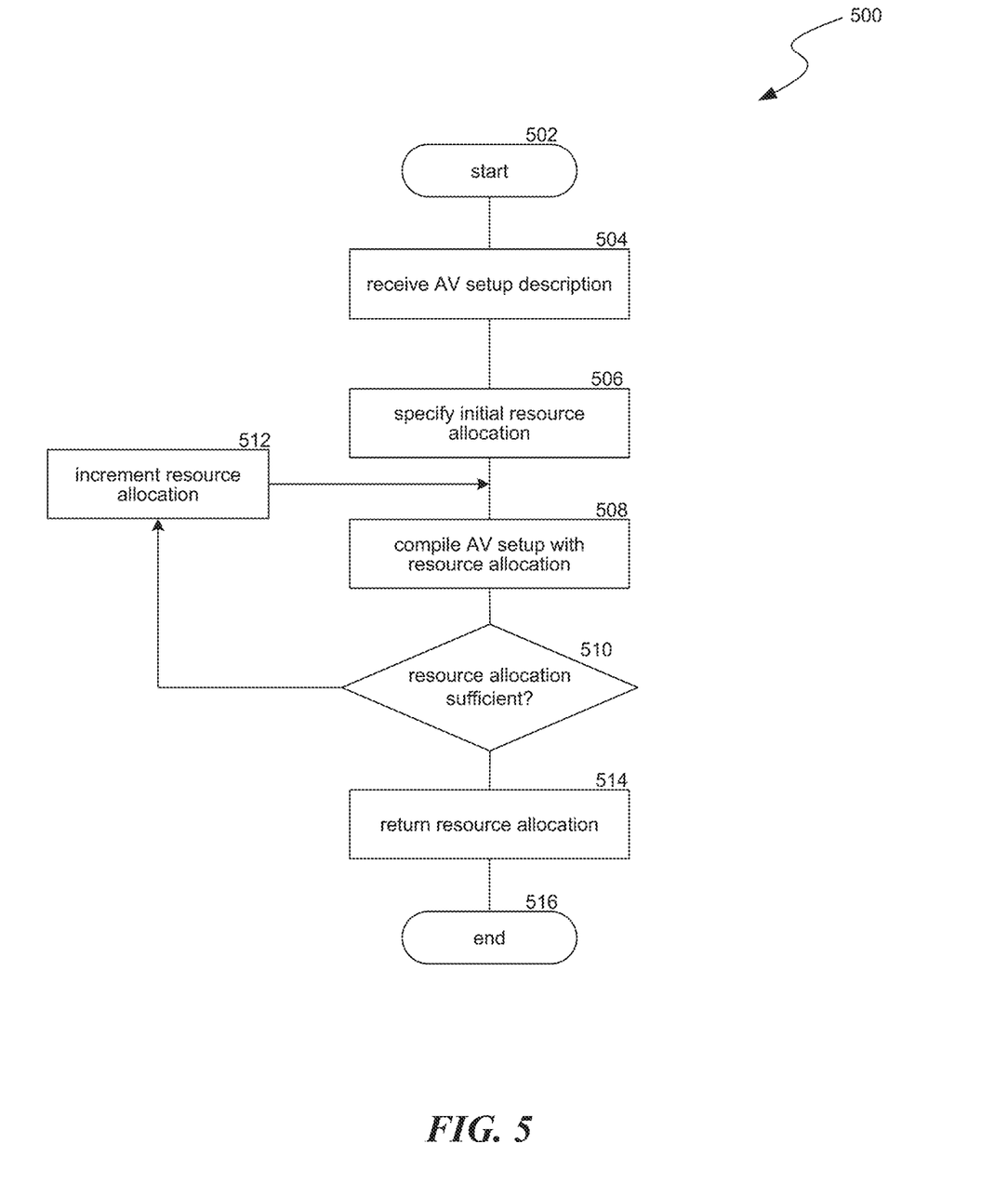
FIG. 5 is a flow diagram illustrating a process used in some implementations for determining a resource allocation for an AVC setup.

FIG. 5 is a flow diagram illustrating a process 500 used in some implementations for determining a resource allocation for an AVC setup. In some implementations, process 500 can be initiated as part of block 406 of process 400. Process 500 begins at block 502 and continues to block 504. At block 504, process 500 can receive a description of an AVC setup. A description of an AVC setup can identify the AVC equipment and software components included in that AVC setup. The description of the AVC setup can also specify how the AVC equipment is interconnected. The description of the AVC setup may also specify additional information such as device identifiers, expected usage rates, connection bandwidths, device specifics, etc.

At block 506, process 500 can specify an initial resource allocation for the described AVC setup. In various implementations, the initial resource allocation can be a default allocation such as a minimum amount of resources (e.g., one CPU core) for any AVC setup or can be a resource allocation determined based on the AVC setup description. For example, an AVC setup with a specified number of devices can have a corresponding initial resource allocation. A resource allocation can include a number of CPUs, an amount of memory space, or other dedicated hardware or software resources.

At block 508, process 500 can run the AVC setup description through an AVC compiler with the current resource allocation set at block 506 or 512. The AVC compiler can organize the AVC setup into a configuration expected to maximize performance and/or minimize resource use. The AVC compiler can also provide projections for how the AVC setup will execute with given the resource allocation. For example, each software component of an AVC setup can require an amount of resources, such as a fraction of one or more CPUs capacity, memory, disk space, etc. The AVC compiler can process the AVC setup to accumulate the resources required for the various equipment and components of that AVC setup.

At block 510, process 500 can determine whether the results from the AVC compiler indicate the resource allocation will provide sufficient performance for the AVC setup. If so, process 500 continues to block 514. If not, process 500 continues to block 512.

At block 512, process 500 can increment the current resource allocation. For example, where the resources are measured in terms of CPU cores, an additional CPU core can be added to the current resource allocation. In some implementations, other resource allocations can be incremented, such as dedicated cache, other memory space, etc.

The loop between blocks 508 and 512 can be repeated until the compiler results indicate that the resource allocation is sufficient for the described AVC setup. At which point, process 500 continues to block 514. At block 514, process 500 can return the determined sufficient resource allocation. Process 500 can then continue to block 516, where it ends.

Figure 6A:
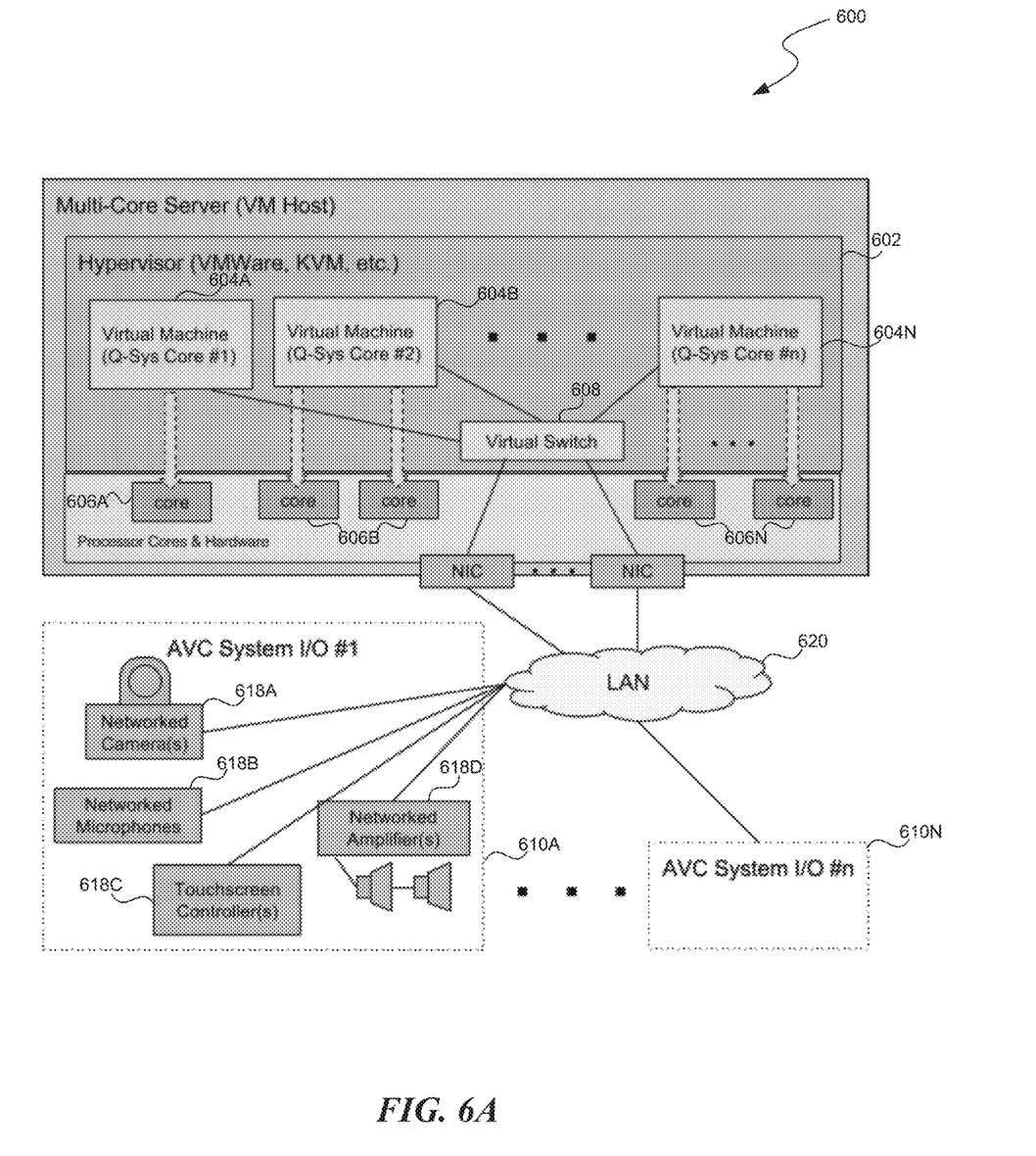
FIG. 6A is a conceptual diagram illustrating an example environment with a hypervisor system administering multiple virtual machines, each with an AVC OS.

FIG. 6A is a conceptual diagram illustrating an example environment 600 with a hypervisor system 602 administering multiple virtual machines 604A-N, each with an AVC OS. Each virtual machine 604 can have allocated resources, such as CPU cores 606. For example, core 606A is allocated to virtual machine 604A; cores 606B are allocated to virtual machine 604B; and cores 606N are allocated to virtual machine 604N. Hypervisor OS 602 can include a virtual switch 608 configured to route AVC signals from devices (e.g., 618A-D), of AVC setups 610A-N, to a virtual machine 604 corresponding to that AVC setup.

In the operation of example environment 600, signals can be passed from networked devices 618, through LAN 620, to virtual switch 608. Using a mapping of a device identifier to an AVC setup corresponding to a virtual machine, virtual switch 608 can route the signal to the appropriate virtual machine, for AVC processing, by the corresponding AVC OS.

In the further operation of example environment 600, once an AVC signal is processed by a virtual machine 604, the signal can be passed back to virtual switch 608 for routing to the appropriate device on an AVC setup 610 or another local or networked destination.

Figure 6B:
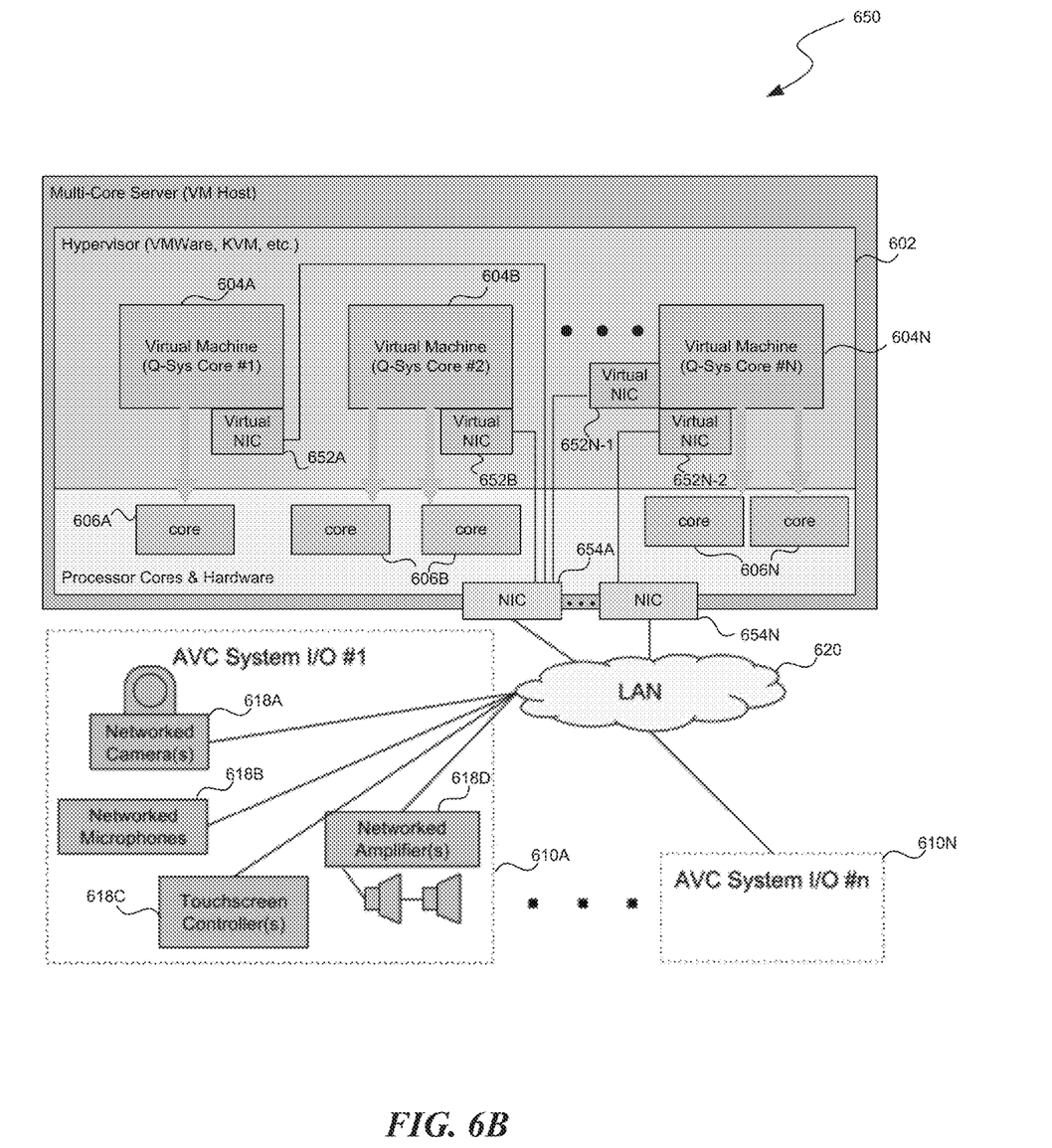
FIG. 6B is a conceptual diagram illustrating an example environment with multiple virtual machines, each with an AVC OS and one or more virtual NICs.

FIG. 6B is a conceptual diagram illustrating an example environment 650 with multiple virtual machines 604, each virtual machine having an AVC OS and one or more virtual network interface cards (NICs) 652.

Similarly to example environment 600, in example environment 650, each virtual machine 604 can have allocated resources, such as CPU cores 606. Each virtual machine 604 can utilize one or more virtual NICs 652. For example, virtual machine 604A can utilize virtual NIC 652A to connect with and control NIC 654A. In addition, virtual machine 604N can utilize virtual NIC 652N-1 to connect with and control NIC 654A and can utilize virtual NIC 652N-2 to connect with and control NIC 654N. Each of the NICs 654 can receive/send data for multiple IP/MAC addresses by utilizing a corresponding virtual NIC from one of the virtual machines 604. For example, when a virtual machine such as virtual machine 604B needs to transmit a signal, it can access virtual NIC 652B which is configured to connect to and control NIC 654A to transmit the signal, e.g., to one of devices 618. While virtual NIC 652B is in control of NIC 654A, NIC 654A can use addresses (e.g., IP, MAC, etc.) assigned to virtual NIC 652B. Also, while virtual machine 604B is utilizing NIC 654A through virtual NIC 652B, other incoming and outgoing traffic received at NIC 654A can be queued until virtual machine 604B's transmission is complete and virtual NIC 652B relinquishes control of NIC 654A or can be handled by another of NICs 654.

As another example, NIC 654A can receive an AVC signal through LAN 620 from a device (e.g., one of devices 618A-D). The AVC signal can be addressed to a particular address (e.g., IP address, MAC address, network name, etc.). Each virtual NIC 652 can be assigned an address, and the NIC 654A can select the virtual NIC with the assigned address to which the AVC signal was sent. The virtual machine corresponding to the selected virtual NIC can then use the selected virtual NIC to receive the AVC signal.

Figure 7:
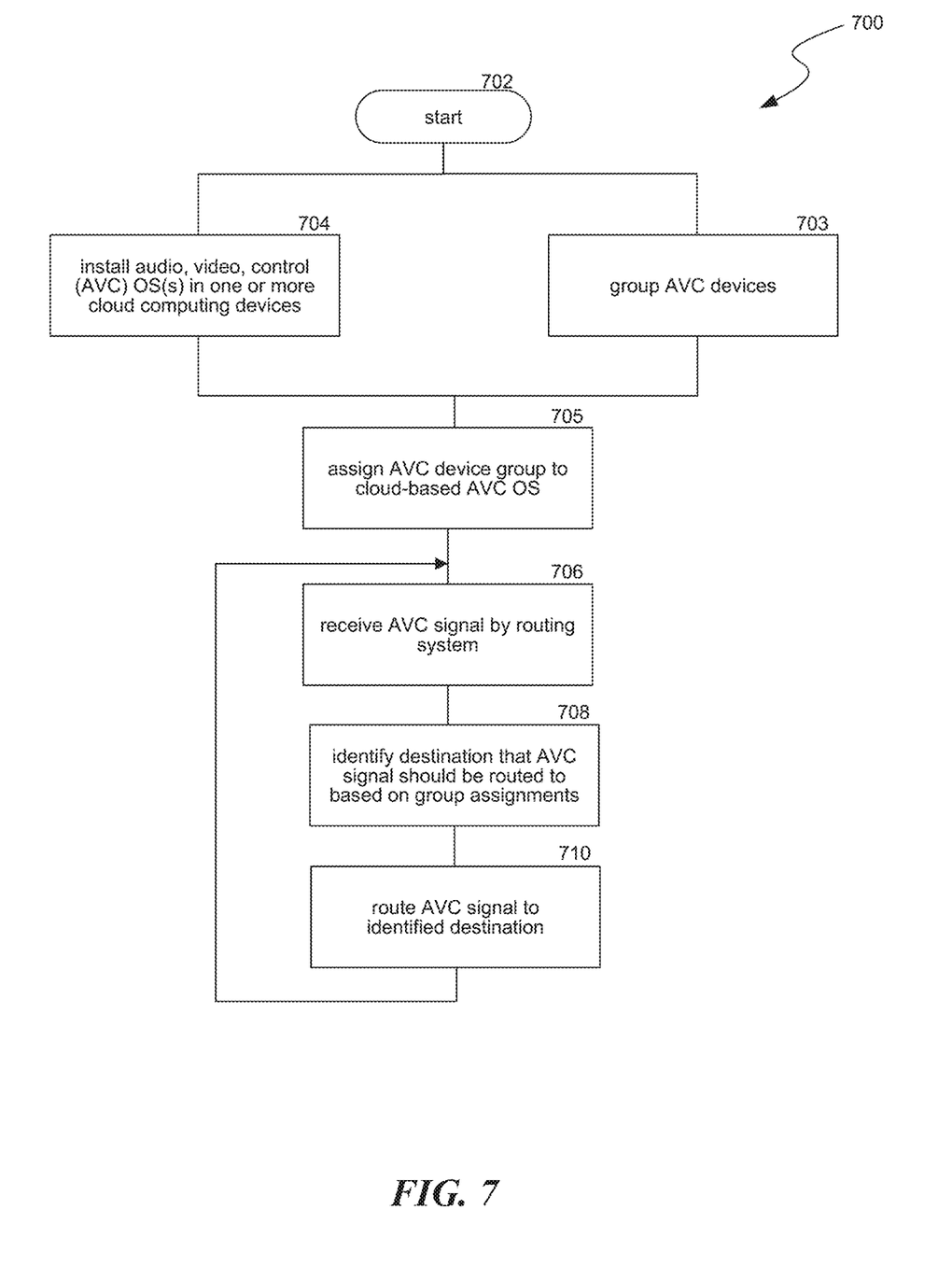
FIG. 7 is a flow diagram illustrating a process used in some implementations for establishing AVC OSs in a cloud environment and providing AVC signal routing for the AVC OSs.

FIG. 7 is a flow diagram illustrating a process 700 used in some implementations for establishing AVC OSs in a cloud environment and providing AVC signal routing for the AVC OSs. Process 700 begins at block 702 and continues to blocks 703 and/or 704. Blocks 703 and 704 can be performed at the same time or at different times. In some cases, block 703 can be performed first while in other cases block 704 can be performed first.

At block 703, process 700 can establish one or more "AVC setup" groups. Each AVC setup can comprise one or more AVC devices. The devices in an AVC setup group can be administered separately from other AVC setups. For example, an AVC setup can include all the AVC equipment on a floor, in a region of a building, for a set of conference rooms, for one or more event spaces, etc. In some implementations, the group of devices that make up an AVC setup can be specified by an administrator. For example, a user interface can be provided allowing an administrator to create AVC setup groups and assign devices to these groups. In some implementations, AVC setups can be created automatically, e.g., based on physical location (e.g., devices in the same room, on the same floor, or in the same building are assigned to the same group), based on virtual location (e.g., all devices that are on the same VPN are assigned to the same group), based on addressing (e.g., all devices with a particular IP address range are assigned to the same group), etc.

At block 704, process 700 can install one or more audio, video, control (AVC) OSs in one or more cloud computing devices. In some implementations, multiple AVC OSs can be installed in a cloud computing environment, under one or more servers, in virtual machines as discussed above. In some implementations, an AVC OS can be installed as the primary OS of a computing device. In some implementations, each AVC OS can be generated, e.g., in a server or virtual machine of a cloud system, in response to the creation of an AVC setup. For example, when an AVC setup needs an AVC OS to perform processing for it, the AVC OS can be created. In other implementations, one or more AVC OSs can be created, before AVC setups are established, ready to be assigned to an AVC setup as required.

At block 705, process 700 can assign each of one or more of the AVC setups from block 703 to one of the AVC OSs from block 704 to perform AVC processing for the set of AVC devices in the AVC setup. The correspondence between an AVC OS and an AVC setup can be established as part of the process for installing the AVC OS, can be performed as part of a process for creating an AVC setup, or can be a separate process. In various implementations, the assignments can be performed manually, e.g., by an administer using a GUI or can be performed automatically, e.g., by creating an AVC OS in a new virtual machine in response to a AVC setup or by assigning an available, previously-created AVC OS to the AVC setup. In various implementations, the assignments can be established as a mapping between A) AVC devices/AVC setups and B) AVC OSs or the assignments can be configurations setup in individual AVC devices specifying an address of an AVC OS to which it should send AVC signals.

At block 706, an AVC routing system can receive an AVC signal. The AVC signal can be from an AVC device included in one of the AVC setups or can be from one of the AVC OSs in the cloud environment. The AVC signal can originate from a source geographically remote (e.g., across a wide area network (WAN)) from the AVC routing system. The AVC signal can also be sent from the AVC routing system to a geographically remote destination. In some implementations, various of the AVC OSs installed at block 704 can be configured to process AVC signals from different organizations or entities. Thus, process 700 can provide centralized AVC processing for multiple entities or organizations, eliminating the cost, complexity, and multiple points of potential failure associated with each organization/entity having their own AVC processing facilities. In various implementations, this centralized AVC processing can be performed on shared hardware or can be performed where each organization/entity has dedicated hardware.

At block 708, the AVC routing system can identify a destination to which it should route the AVC signal. In some implementations, each AVC OS operating in the cloud environment can have a specified address (e.g., IP address). Devices in a particular AVC setup can be configured to send their AVC signals an address of an AVC OS. This can be the AVC OS dedicated to AVC processing for that device or set of devices. Similarly, AVC signals received by the AVC OS can be associated with an address of a destination device to which the AVC OS can send the signal after the AVC OS completes AVC processing. Thus, in some implementations, the AVC routing system can be one or more network devices (e.g., routers, switches, hubs, etc.).

In other implementations, an AVC routing system can be an entity resident either as part of an AVC setup or in the cloud environment. This AVC routing system can receive AVC signals from devices in an AVC setup and send them to a corresponding AVC OS in the cloud environment. Conversely, the AVC routing system can receive processed AVC signals from AVC OSs and send them to a destination device. In some implementations, the AVC routing system can accomplish this routing using a mapping, as discussed above in relation to block 705. In various implementations, the mappings can use identifiers such as IP addresses, MAC addresses, host names, port identifiers, or other identifiers that uniquely specify a destination within the AVC system. The mapping can index devices to an AVC OS configured to perform AVC processing for those devices. The mapping can also index devices to an AVC setup designation and can further index an AVC setup designation to a corresponding AVC OS for that AVC setup.

At block 710, the AVC signal can be routed to the destination determined at block 708. When the destination is an AVC OS, the AVC signal can then be processed by that AVC OS and sent on to a destination, e.g., using steps 706-710. Steps 706 through 710 of process 700 can be repeated as additional AVC signals are received from devices or AVC OSs.

Figure 8:
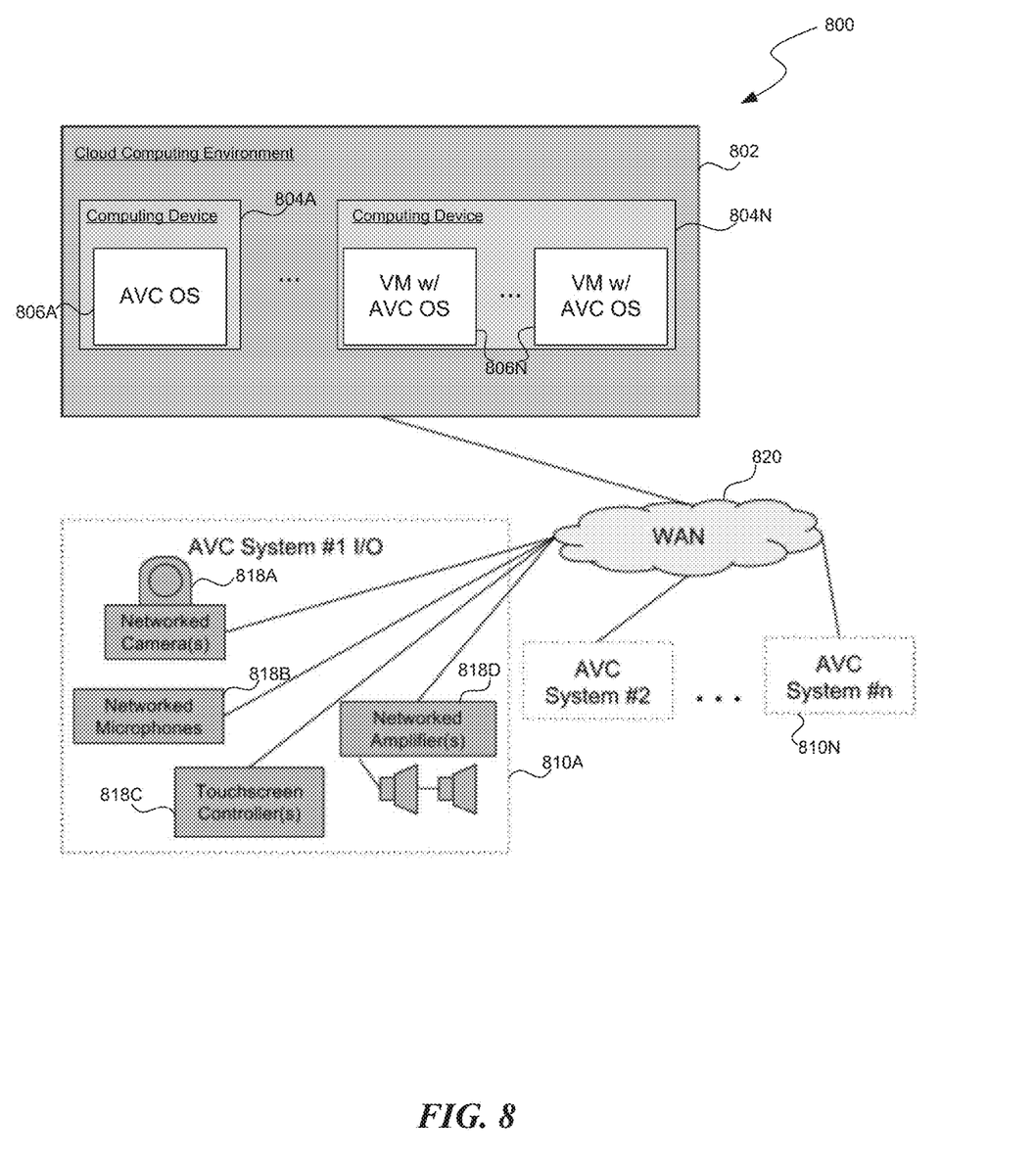
FIG. 8 is a conceptual diagram illustrating an example environment with AVC OSs that operate in a cloud environment.

FIG. 8 is a conceptual diagram illustrating an example environment 800 with AVC OSs 806 that operate in a cloud environment 802. Each of cloud computing devices 804A-804N can have one or more AVC OSs installed. For example, computing device 804A has AVC OS 806A installed while computing device 804N hosts multiple virtual machines, each with a corresponding AVC OS (as discussed above in relation to FIGS. 3-6).

In the operation of example environment 800, signals can be passed from networked devices 818, through network 820, to cloud computing environment 802. Using a mapping of a device identifier to an AVC setup corresponding to a AVC OS, a routing system of cloud computing environment 802 can route the signal to the appropriate AVC OS 806 for AVC processing.

In the further operation of example environment 800, once an AVC signal is processed by an AVC OS 806, the signal can be passed back to the routing system of cloud computing environment 802 for routing to the appropriate device on an AVC setup 810 or another local or networked destination.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for operating an audio, video, control (AVC) system, the method comprising:
    establishing multiple AVC setup groups, wherein each of the multiple AVC setup groups comprises one or more AVC devices, and wherein the multiple AVC setup groups include at least a first AVC setup group and a second AVC setup group;
    establishing, on a host system, multiple virtual machines, wherein each of the multiple virtual machines includes an AVC real-time operating system (RTOS) configured to perform real-time AVC processing for a corresponding AVC setup group from the two or more AVC setup groups;
    determining a first assignment of the first AVC setup group to a first virtual machine from the multiple virtual machines;
    determining a second assignment of the second AVC setup group to a second virtual machine different from the first virtual machine such that the second AVC setup group is administered separate from the first AVC setup group;
    receiving a first AVC signal from a first AVC device in the first AVC setup group;
    routing the first AVC signal to the first virtual machine;
    processing the first AVC signal by the AVC RTOS included in the first virtual machine;
    receiving a second AVC signal from a second AVC device in the second AVC setup group;
    routing the second AVC signal to the second virtual machine; and
    processing the second AVC signal by the AVC RTOS included in the second virtual machine.

2. The method of claim 1 further comprising implementing, on the host system, a hypervisor with a signal switch, wherein the signal switch performs the routing of the first and second AVC signals to the first and second virtual machines.

3. The method of claim 1, wherein the routing is performed using a mapping of A) first identifiers for AVC devices or for AVC setups to B) second identifiers for AVC OSs or for virtual machines, to determine where to route the AVC signals.

4. The method of claim 3,
    wherein elements of the mapping are created in response to the first and second assignments; and
    wherein the first identifiers comprise one or more of: IP addresses, MAC addresses, host names, port identifiers, or any combination thereof.

5. The method of claim 3, wherein the mapping includes a first mapping of device identifiers to AVC setup group identifiers and a second mapping of AVC setup group identifiers to identifiers associated with virtual machines.

6. The method of claim 1,
    wherein one or more virtual network interface cards (NICs) are each associated with a corresponding one of the multiple virtual machines;
    wherein each of the virtual NICs is assigned one or more addresses;
    wherein, when a NIC of the host system is routing messages to or from a particular virtual machine, the NIC of the host system utilizes at least one of the one or more addresses of the virtual NIC associated with the particular virtual machine; and
    wherein the routing of the first AVC signal to the first virtual machine comprises utilizing a first virtual NIC that is associated with the first virtual machine to implement communications between the NIC of the host system and the first virtual machine.

7. The method of claim 1 further comprising:
    receiving a third AVC signal from the first virtual machine, wherein the third AVC signal is associated with at least one AVC device in the first AVC setup group; and
    sending the third AVC signal to the at least one AVC device by:
        applying a mapping, by a signal switch of a hypervisor of the host system, to select a destination address, wherein applying the mapping is based on the association with the at least one AVC device in the first AVC setup group; or
        transmitting the third AVC signal based on the association with at least one AVC device in the first AVC setup group, wherein the association is an identification of a network address for one or more AVC devices in the first AVC setup group.

8. The method of claim 1, wherein establishing at least the first virtual machine comprises assigning host system resources to the first virtual machine by:
    receiving a description of the first AVC setup group that identifies the one or more AVC devices established in the first AVC setup group;
    specifying an initial resource allocation as a current resource allocation for the AVC setup group; and
    until an expected performance level for the current resource allocation reaches at least at a threshold performance level,
        using a complier with the current resource allocation to organize the AVC setup group into a configuration;
        determining the expected performance level for the configuration; and
        when the expected performance level is less than the threshold performance level, incrementing the current resource allocation.

9. The method of claim 8, wherein the description of the first AVC setup group specifies one or more of: how the one or more AVC devices are interconnected, expected usage rates for the one or more AVC devices, connection bandwidths, or any combination thereof.

10. The method of claim 8, wherein incrementing the current resource allocation comprises allocating one or more additional CPU cores to the current resource allocation for the first AVC setup group.

11. The method of claim 8 further comprising:
identifying a change to the first AVC setup group; and
in response to the identifying the change, assigning additional resources to the first virtual machine.

12. The method of claim 1, wherein processing the first AVC signal comprises one or more of: acoustic echo cancellation, audio tone control and filtering, audio dynamic range control, audio/video mixing, audio/video delay synchronization, process or control logic, or any combination thereof.

13. A computer-readable storage medium storing instructions that, when executed by a computing system, cause the computing system to perform operations comprising:
establishing two or more AVC setup groups, wherein each of the two or more AVC setup groups comprises one or more AVC devices;
establishing, on a host system, multiple virtual machines, wherein each of the multiple virtual machines includes an audio, video, control (AVC) operating system (OS);
determining a first assignment of a first AVC setup group from the two or more AVC setup groups to a first virtual machine from the multiple virtual machines;
determining a second assignment of a second AVC setup group from the two or more AVC setup groups to a second virtual machine different from the first virtual machine such that the second AVC setup group is administrable separate from the first AVC setup group;
receiving AVC signals from multiple AVC devices in the first AVC setup group and the second AVC setup group; and
routing each of the AVC signals to a corresponding destination virtual machine based on the first assignment and the second assignment, of the multiple virtual machines, wherein each AVC OS included in each destination virtual machine processes the AVC signals routed to that destination virtual machine.

14. The computer-readable storage medium of claim 13, wherein processing at least one of the AVC signals comprises one or more of: acoustic echo cancellation, audio tone control and filtering, audio dynamic range control, audio/video mixing, audio/video delay synchronization, or any combination thereof.

15. The computer-readable storage medium of claim 13, wherein one or more virtual network interface cards (NIC) are each associated with a corresponding one of the multiple virtual machines;
wherein each of the virtual NICs is assigned one or more addresses;
wherein, when a NIC of the host system is routing messages to or from a particular virtual machine, the NIC of the host system utilizes at least one of the one or more addresses of the virtual NIC associated with the particular virtual machine; and
wherein the routing of a first AVC signal of the AVC signals to a first virtual machine of the multiple virtual machines comprises utilizing a first virtual NIC that is associated with the first virtual machine to implement communications between the NIC of the host system and the first virtual machine.

16. A computing system comprising:
one or more processors;
one or more memories;
a hypervisor configured to establish multiple virtual machines, wherein:
each of the multiple virtual machines includes an audio, video, control (AVC) operating system (OS) that is configured to perform real-time AVC processing for a corresponding AVC setup group from a plurality of AVC setup groups established separately from the multiple virtual machines,
each of the AVC setup groups includes a plurality of remote AVC devices, and
a first AVC setup group is assigned to a first virtual machine and a second AVC setup group is assigned to a second virtual machine separate from the first virtual machine, wherein the first AVC setup group is configurable independently from the second AVC setup group;
one or more interfaces configured to receive AVC signals from multiple remote sources in each of the AVC setup groups; and
a signal switch configured to route each of the AVC signals to a corresponding destination virtual machine, of the multiple virtual machines, wherein each AVC OS included in each destination virtual machine processes the AVC signals routed to that destination virtual machine.

17. The system of claim 16, wherein the signal switch performs the routing using a mapping of A) first identifiers for AVC devices or for AVC setup groups to B) second identifiers for AVC OSs or for virtual machines, to determine where to route the AVC signals.

18. The system of claim 16, wherein at least one of the AVC OSs included in the multiple virtual machines is an x86 framework compatible OS.

19. The system of claim 16 further comprising a resource allocator configured to exclusively assign one or more of the multiple virtual machines to one or more CPU cores of the one or more processors.

* * * * *